(12) United States Patent
Fritts

(10) Patent No.: US 7,784,435 B1
(45) Date of Patent: Aug. 31, 2010

(54) PARTICULATE DEFLAGRATION COMBUSTION ENGINE

(75) Inventor: Donald Keith Fritts, Tulsa, OK (US)

(73) Assignee: Deflagration Energy, L.L.C., Broken Arrow, OK (US)

(*) Notice: Subject to any disclaimer, the term of this patent is extended or adjusted under 35 U.S.C. 154(b) by 0 days.

(21) Appl. No.: 12/196,372

(22) Filed: Aug. 22, 2008

(51) Int. Cl.
*F02B 45/00* (2006.01)
(52) U.S. Cl. ...................................... 123/23
(58) Field of Classification Search ........... 123/23
See application file for complete search history.

(56) References Cited

U.S. PATENT DOCUMENTS

| | | | | |
|---|---|---|---|---|
| 2,319,314 | A | * 5/1943 | Friedrich et al. ............ 123/310 |
| 4,052,963 | A | 10/1977 | Steiger |
| 4,059,077 | A | 11/1977 | Steiger |
| 4,086,883 | A | 5/1978 | Steiger |
| 4,240,379 | A | * 12/1980 | Armbruster ................... 123/23 |
| 4,244,701 | A | 1/1981 | Yamashita |
| 4,345,527 | A | 8/1982 | Marchand |
| 4,359,970 | A | 11/1982 | Wolters |
| 4,434,753 | A | * 3/1984 | Mukainakano et al. .. 123/143 B |
| 6,810,723 | B2 | * 11/2004 | Lemecha et al. ......... 73/114.09 |
| 7,201,781 | B2 | 4/2007 | Pourtout |
| 7,374,587 | B2 | 5/2008 | Lewis |

FOREIGN PATENT DOCUMENTS

DE 102006007695 A1 * 8/2007

* cited by examiner

*Primary Examiner*—Noah Kamen
(74) *Attorney, Agent, or Firm*—Molly D. McKay

(57) ABSTRACT

A particulate deflagration combustion engine for burning particulate fuel and method. Fine fuel particles are fed to a mixing box by a pre-measured auger system where the fuel is mixed with dried, compressed combustion air in a desire fuel to air ratio. The fuel mixture enters a combustion cylinder where it is ignited by a pair of spark plugs located approximately 120 degrees apart in the walls of the cylinder. The hot combustion gases leave the cylinder and are vented through an exhaust stack. The exhaust stack is connected to air driers supplying dry combustion air to the engine, thereby pulling a vacuum on the air driers and removing moisture from the air driers. A control panel receives input from dew point monitors, oxygen sensors, and infrared sensors provided in the engine to control the operation of the engine.

13 Claims, 1 Drawing Sheet

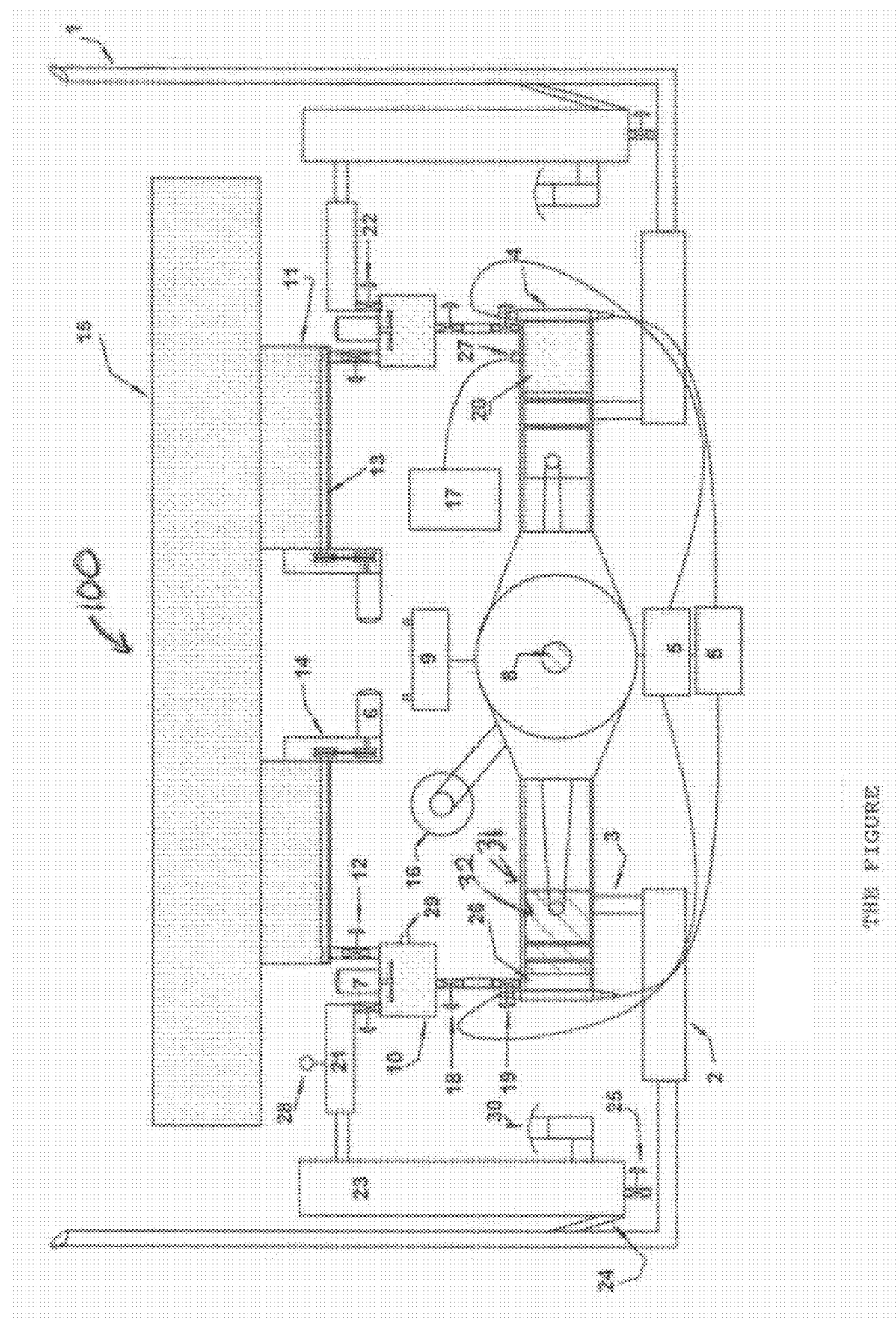
THE FIGURE

PARTICULATE DEFLAGRATION COMBUSTION ENGINE

BACKGROUND OF THE INVENTION

1. Field of the Invention

The present invention relates to a modified combustion engine for burning particulate fuel, such as corn starch or other suitable renewable energy source and a method for operating same. The invention includes a fuel feed system which delivers the powdered or particulate fuel to a mix chamber where it is mixed with previously dried and compressed air. The fuel mixture is then delivered to the combustion chamber of a valve where it undergoes expansion, compression and then deflagration to power the combustion engine.

2. Description of the Related Art

It is long been known that fine solid particles, such as flour, can be a very volatile material under the proper conditions. The National Fire Protection Agency has established a volatility value to most common particulate fuels or dusts in the form of a Kst rating which is a deflagration index for dusts and is expressed as bars/millisecond. If methane is compared to corn starch under detonation conditions, the corn starch produces three times the energy force of the methane gas per unit volume. It has long been recognized that solid fuels are a more effective fuel source than gas which is why rockets are powered by solid fuel cells.

There are four factors that are needed to produce an explosion, whether in the combustion chamber of an engine or any other enclosure. They are a fuel source, an oxidant, a containment area, and an ignition source. In a simple combustion engine, the fuel source is vaporized liquid gasoline, the oxidant is air, the cylinder is the containment area, and the spark plug is the ignition source. The cylinder containment area is created collectively by the cylinder wall, the piston and cylinder head.

On the down stroke of the piston the inlet valve opens and allows the fuel and air mixture to enter the combustion chamber. As the piston returns to the top position, the inlet valve closes and the mixture is compressed. When the piston reaches the top of the stroke, the spark plug detonates the fuel causing the piston to be driven to the down position, turning a crank shaft and producing work force which has the discharge valves vent gas from the combustion chamber.

The combustion engine only requires the fuel source to produce the required energy to drive the shaft work force requirements and that the fuel burns fully and does not coat the valves, cylinder head or cylinder walls. Certain dusts or particulate fuel would burn cleanly and would produce very high energy levels when burned as fuel in a combustion engine. These particulate fuels would include cornstarch, soy flour, sucrose, coffee and wheat. Chemical particulate fuel such as ethylene diamine, ortazol, coal, charcoal and sodium lignosulfate would also be good fuel sources.

A standard combustion engine would, of course, require modifications to use dust fuel and to overcome challenges of burning fuels that the engine was not designed to burn. The first major challenge or modification that would be needed in a standard combustion engine would be in the delivery system of the fuel and air mixture to the combustion chamber.

The second major challenge or modification that would be needed would be in the means to control the increased heating of the combustion chamber. In a standard combustion engine, vaporized gasoline provides cooling to the combustion chamber during the down stroke of the piston. To offset this lost cooling, the particulate fuel mixture should be delivered at a pressure of 25 psig or greater to the combustion chamber where it will be allowed to expand. This expansion will cause a Joule-Thomson effect or a refrigeration effect due to the decrease in pressure of the fuel mixture as is moves from the storage system to the combustion chamber.

Under normal conditions, the fuel to air ratio would be between approximately 1-2 percent particulate fuel and between 98-99 percent compressed air. The mixing system must be able to suspend the particulate fuel particles in the air mixture until the spark is delivered to the combustion chamber. During acceleration, the engine would require more power and the fuel to air ratio would increase to as much as 5-7 percent particulate fuel and 93-95 percent air. This makes the engine very efficient. It is estimated that a four cylinder car could travel 100 miles at 65 miles an hour on a single pound of particulate cornstarch fuel. Because of the very low LFL (lower flame level) or low ignition point of cornstarch, there would be nearly complete burning of the fuel, with very little material to collect on the moving surfaces of the combustion chamber or valves. This clean burning fuel would eliminate most waste bi-products from the engine exhaust.

Particulate fuel is a truly renewable fuel source that requires very little refining and processing. The fuel is readily available and safe to store and transport because it is only volatile once the four elements required for detonation are present, i.e. fuel, oxidizer, containment, and ignition. The use of particulate fuel as a fuel source could be expanded to use in heating homes, in producing electricity and in space travel. The knowledge and technology for such uses is available now.

The term "detonation" means a loud, violent explosion. Thus detonation is not desirable in a combustion engine. Detonation can cause major damage to an engine. The proper term for the method of combustion would be "deflagration" which is burning fuel at a rate below sonic velocity. Deflagration is the desired type of combustion of the present invention. By controlling the fuel mixture and limiting the size of the combustion chamber, detonation would be unlikely under normal conditions for a combustion engine of the present invention. It is also important to control the size of the particulate fuel particle to achieve uniform and clean burning. The smaller the particulate fuel particle, the faster the deflagration occurs. Thus it is important that the fuel be reduced to the proper particle size before use in the present invention. A particle size of between 8-12 microns is preferred.

It is also important in the engine of the present invention to control the quality of the incoming air. If the air contains too much moisture, the fuel mixture will burn too slowly or will not burn at all and will not produce the discharge energy required. By feeding the inlet air through desiccant dryers, a moisture level in the combustion air can be maintained at a minimum level of −10 degrees pressure dew point. To achieve this level of moisture reduction in the combustion air, the system would use two dryers. One dryer would provide combustion air to the compressor, while the second dryer would be purging the water vapor it had collected. The purging dryer would be under a slight vacuum produced by a venturi created in association with the exhaust stack of the engine. The dryers would alternate every few minutes so that a fresh purging dryer would always be supplying the dried air to the mixing chamber where the air would be mixed with the fuel.

To increase lubrication to the cylinder wall, a small amount of graphite particles could be added to the fuel mixture. It is believed that a graphite level of 0.01 percent would not retard the combustion rate and would provide the needed lubrication.

Because the present engine uses renewable resources as its fuel source, it can offer an endless source of clean, efficient energy for many generations to come.

Although some prior art patents suggest the desirability of burning renewable fuels, the prior art patents do not address how the fuel would be delivered to the combustion chamber so that the engine operates efficiently on these fuels, i.e. preparing the fuel to the proper particle size and moisture content and mixing or atomizing it with oxidant. Operating an internal combustion or turbine on organic particles requires a high degree of control of the fuel which is not taught in the prior art. If moisture is not adequately controlled, the engine might only function when the relative humidity is very low. If the fuel to air ratio is not proper, then there is incomplete burning or there is detonation.

Another key component to a successful organic fuel-burning engine is to maintain and control the burning speed of the fuel. The engine must operate under "deflagration" conditions. If burning speed exceeds subsonic velocity, then detonation occurs which will severally damage the engine. There are five elements that must be controlled in order to control the burning speed of the fuel. These elements are particle size of the fuel, pressure dew point of the combustion air, fuel to air mixture ratio, containment area, and ignition source. The present invention controls all five elements for successful operation.

The pre-burn preparation of the fuel and the pre-ignition mixing of the proper fuel to air ratio of the fuel and air mixture that enters the combustion chamber are mandatory for successful operation of a particulate combustion engine. The prior art attempts to combine the particulate fuel and air in the combustion chamber and this leads to incomplete mixing and failure to achieve the crucial uniform particle suspension of the fuel mixture prior to combustion. If particle suspension does not occur before combustion, then only a portion of the fuel will be burned. The unspent or unburned fuel will then coat the combustion chamber and greatly damage the engine, resulting in further reduction in engine performance and a greater likelihood of detonation of the fuel.

The present invention pre-mixes the fuel air ratio before it enters the combustion chamber. The invention employs an infrared sensor that monitors the combustion chamber for fuel density and flame speed of the deflagration before and during the combustion phase. If the burn speed nears sonic velocity the fuel mixture ratio changes to retard the burn speed. This system allows for total consumption of the fuel and prevents unburned fuel from damaging the engine. Oxygen and dew point sensors insure that the combustion air quality entering the pre-combustion mixing chamber remains within the proper range.

Obviously, because each fuel has a different Kst value, the delivery system would need to be adjusted for a new fuel should the type of fuel employed in the invention be changed.

SUMMARY OF THE INVENTION

The present invention is a particulate deflagration combustion engine that burns fine solid particle fuel and a method for operating the engine. A fuel particle size of between 8-12 microns is preferred for this application to achieve proper burning in the engine. The fuel is fed to a mixing box by means of a pre-measured auger system. Within the mixing box, the fuel is mixed in the desired fuel to air ratio with previously dried and compressed combustion air. The desired fuel to air ratio will vary depending on the acceleration of the engine, but will generally be in the range of 1-7% particulate fuel to 93-99% air. The fuel and air mixture is then delivered to a combustion cylinder where it is ignited by a pair of spark plugs located in the walls of the cylinder approximately 180 degrees apart from each other. On the exhaust stroke of the piston, the hot combustion gases are vented through an exhaust stack to atmosphere. The exhaust stack is connected to air driers that supply dry combustion air for the engine. The hot combustion gases flowing through the exhaust stack serve to pull a vacuum on the air driers, resulting in removal of moisture from the air driers. Moisture from the air driers is pulled into the hot combustion gas stream and exhausts with the hot combustion gases to atmosphere via the exhaust stack.

The operation of the engine is controlled by a control panel that is connected to the operational components of the engine and controls their operation in response to input from dew point monitors that monitor the moisture content of the dried air, oxygen sensors that monitor the air present in the fuel and air mixture, and infrared sensors that monitor the burn of the fuel.

BRIEF DESCRIPTION OF THE DRAWINGS

FIG. 1 is a diagram showing a particulate deflagration combustion engine constructed in accordance with a preferred embodiment of the present invention.

DETAILED DESCRIPTION OF THE PREFERRED EMBODIMENT

Referring now to FIG. 1, there is illustrated a particulate deflagration combustion engine 100 that is constructed in accordance with a preferred embodiment of the present invention. The fuel that is used in this engine 100 will need to have been previously reduced to the proper particle size by grinding or other suitable means and has passing it through sizing sieves to achieve the desired particle size range. A particle size of between 8-12 microns is preferred for this application to achieve proper burning in the engine 100. The previously prepared particulate fuel is put into the main fuel tank 15 of the engine 100 which is shown at the top of FIG. 1.

FIG. 1 is a diagram of the engine 100. For ease of illustration, FIG. 1 shows only two cylinders 31. However, the actual engine 100 is not limited to two cylinders 31. Also, the arrangement of the components of the actual engine 100 may be somewhat different than illustrated in FIG. 1 since the diagram is presented to illustrate the functional relationship of engine components and not the actual physical configuration of the components.

Beginning at the top of FIG. 1, the engine 100 will be described in the order in which the fuel flows through the engine 100. Although the engine 100 has more than one cylinder 31 to which fuel is delivered from the main fuel tank 15, the components associated with only one cylinder 31 will be described since those components are duplicated for each cylinder 31 of the engine 100. All of the components are duplicated for each cylinder 31 of the engine 100 except that there will generally only be two air dryers 23 employed for the engine so that one air dryer 23 is in service supplying air for all of the cylinders 31 at any given time while the other air dryer 23 is being regenerated.

Referring now to FIG. 1, the particulate fuel is fed into a main fuel cell 15 of the engine 100 from which it is then fed to a mixing box 10 via an auger drive system 14 that is contained within an auger housing 11. The auger drive system 14 consists of an auger drive motor 6 that rotates a pre-measure auger shaft 13. As the auger shaft rotates, it delivers a pre-measured amount of particulate fuel from the main fuel cell 15 to the mixing box 10 via a fuel mixing valve 12.

Combustion air enters the engine 100 via filtered air intakes 30. From the filtered air intakes 30, the combustion air is channeled through one of the two desiccant dryer beds or air dryers 23 that dries the air and delivers it to a combustion air compressor 21. Each desiccant dryer bed 23 has a dryer drain valve 25 located at the bottom for draining off water from the dryer bed 23. Also each desiccant dryer bed 23 and is attached to an exhaust stack 1 via a venturi dryer purge pipe 24 that functions to pull a vacuum on the beds 23 to thereby remove moisture from them.

The combustion air is compressed in the combustion air compressor 21 and the compressed air is then delivered to the mixing box 10 via air mixing valve 22. Within the mixing box 10, the dried and compressed combustion air is thoroughly mixed with the particulate fuel in the desired ratio by a motor powered mixing fan 7. Under normal conditions, the fuel to air ratio would be between approximately 1-2 percent particulate fuel and between 98-99 percent compressed air. The mixing box 10 must be able to suspend the fuel particles in the air mixture and keep them in suspension until ignition occurs in the combustion chamber 20 of the cylinder 31. During acceleration, the engine 100 would require more power and the fuel to air ratio would increase to as much as 5-7 percent particulate fuel and 93-95 percent air.

Once the mixture is thoroughly mixed together, a portion is drawn out through a pre-charge valve 18 where it remains momentarily until it is permitted to enter the combustion chamber 20 of the cylinder 31 upon the opening of a charge valve 19 located between the pre-charge valve and the combustion chamber 20. The fuel mixture should be delivered at a pressure of approximately 25 psig or greater to the combustion chamber 20 where it will be allowed to expand and provide some cooling to the cylinder 31.

Once the fuel and air mixture is inside the combustion chamber 20, the charge valve 19 closes and the associated valve 32 moves to the combustion stage 26, as illustrated on the left hand side of FIG. 1. Once at the combustion stage 26, the magnetos 5 send electrical impulses to the pair of spark plugs 4 that are located one on either side of each cylinder 31. The electrical impulses are received by the pair of spark plugs 4 and a spark is created at each spark plug 4 which in turn ignites the fuel within the combustion chamber 20.

The location of the spark plugs 4 is important because of the shape of the flame front created in the particulate fuel mixture upon ignition of the fuel. The flame front generated at each spark plug 4 is in the form of a V-shape with the point of the "V" at the location of the spark plug 4. Thus the main thrust of the expansion energy is exerted along the sides of the "V" or laterally and at approximately a 90 degree angle from the orientation of the igniting spark plug 4. By locating the spark plugs 4 in the sides of the cylinder 31 instead in the head or end of the cylinder 31, the valve 32 receives maximum energy from the burning fuel. Two spark plugs 4 are employed to balance the thrust exerted against the valve 32 and to insure more complete burning of the fuel. The two spark plugs 4 are preferably located approximately 180 degrees from each other at the top end of their associated cylinder wall.

Combustion of the fuel upon ignition by the spark plugs 4 drives the valve 32 that is located in the cylinder 31 in a direction away from the spark plugs 4. Although not specifically illustrated, as with most internal combustion engines, the valve 32 is attached to a cam shaft (not illustrated) which in turn rotates an attached output shaft 8 which is the driving mechanism of the engine 100. The valve 32 will then move in the opposite direction within the cylinder 31, i.e. back toward the spark plugs 4 again in coordination with the opening of an exhaust valve (not illustrated) that allows the combustion gases from the combustion chamber 20 to enter a cylinder discharge port 3, then pass through a muffler 2 and finally discharge out to atmosphere via the exhaust stack 1.

As previously described the exhaust stack 1 has a connection via drier purge pipe 24 to the air dryer 23. The drier purge pipe 24 serves as a venturi and as the hot exhaust gases exit through the exhaust stack 1, a vacuum is pulled on the air dryer 23 via the drier purge pipe 24 and the vacuum pulls moisture out of the air dryer 23 and into the exhausting combustion gas steam.

As illustrated in FIG. 1, the engine 100 is provided with a battery 9 that supplies power for the various components of the engine 100 and an alternator 16 that receives rotational power from the output shaft 8 and converts that mechanical energy to electrical energy that is used to recharge the battery 9. Also, the engine 100 is provided with a control panel 17 that controls the functioning of the engine 100. Additionally, the engine is provided with infrared sensors 27 on the cylinders 31 that monitor the burn of the fuel and provide feedback to the control panel 17 to allow the control panel to control the fuel and oxygen supply. Also, the engine 100 is provided with a dew point monitor 28 located in the combustion air compressor 21 that monitors the moisture content of the dried air and provides feedback to the control panel 17 to allow the control panel 17 to control switching between the desiccant dryer beds 23. Further the engine 100 is provided with oxygen sensors 29 located in the mix boxes 10 that monitor the air present in the fuel and air mixture and provide feedback to the control panel 17 to allowing the control panel 17 to control the fuel and oxygen supply.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A particulate deflagration combustion engine comprising:

a particulate fuel delivery system attaching a main fuel cell with a mixing box for delivering a measured portion of particulate fuel from the main fuel cell to the mixing box, a dried and compressed air delivery system attaching air drier and air compressor with the mixing box for delivering a portion of dried and compressed combustion air from the air drier and air compressor to the mixing box, mixing means provided in the mixing box for mixing the measured portion of particulate fuel with the portion of dried and compressed air to form a fuel and air mixture, a fuel and air mixture delivery system attaching the mixing box with a combustion chamber of a cylinder for delivering a portion of the fuel and air mixture to the combustion chamber, dual ignition sources provided in the walls of the cylinder for igniting the fuel and air mixture under deflagration conditions to create hot combustion gases and to operate a valve located within the cylinder and rotate an output shaft that is functional attached to the valve, an exhaust system attaching the combustion chamber with atmosphere for venting the hot combustion gases from the combustion chamber to atmosphere, and said exhaust system attached to the air dryer to remove moisture from the air dryer and exhaust the moisture thus removed to atmosphere with the hot combustion gases.

2. A particulate deflagration combustion engine according to claim 1 further comprising:
   a control panel attached to said particulate fuel delivery system for controlling the delivery of measured portions of particulate fuel from the main fuel cell to the mixing box.

3. A particulate deflagration combustion engine according to claim 2 further comprising:
   said control panel attached to said dried and compressed air delivery system for controlling the delivery of portions of dried and compressed combustion air from the air drier and air compressor to the mixing box.

4. A particulate deflagration combustion engine according to claim 3 further comprising:
   said control panel attached to said fuel and air mixture delivery system for controlling the delivery of portions of fuel and air mixture to the combustion chamber of a cylinder.

5. A particulate deflagration combustion engine according to claim 4 further comprising:
   an infrared sensor attached to the cylinder and monitoring the burning of the fuel and air mixture in the cylinder, and said infrared sensor attached to and providing input information to said control panel.

6. A particulate deflagration combustion engine according to claim 4 further comprising:
   a dew point monitor attached to the dried and compressed air delivery system and monitoring the moisture of the dried and compressed combustion air, and said dew point monitor attached to and providing input information to said control panel.

7. A particulate deflagration combustion engine according to claim 4 further comprising:
   an oxygen sensor attached to the mixing box and monitoring the oxygen content of the fuel and air mixture, and said oxygen sensor attached to and providing input information to said control panel.

8. A particulate deflagration combustion engine comprising:
   a particulate fuel delivery system attached to and delivering a measured portion of particulate fuel to a mixing box,
   a dried and compressed air delivery system attached to and delivering dried and compressed combustion air to the mixing box,
   mixing means provided in the mixing box for mixing the particulate fuel with the dried and compressed air to form a fuel and air mixture,
   a fuel and air mixture delivery system attached between the mixing box and a combustion chamber of a cylinder and delivering the fuel and air mixture to the combustion chamber,
   dual ignition sources provided in the walls of the cylinder for igniting the fuel and air mixture under deflagration conditions, and
   said exhaust system attached to at least one air dryer that supplies dry combustion air to the mixing box for the purpose of removing moisture from the air dryer and exhausting the moisture thus removed to atmosphere with the hot combustion gases.

9. A particulate deflagration combustion engine according to claim 8 further comprising:
   a control panel attached to said particulate fuel delivery system and controlling the delivery of particulate fuel to the mixing box.

10. A particulate deflagration combustion engine according to claim 9 further comprising:
    said control panel attached to said dried and compressed air delivery system and controlling the delivery of dried and compressed combustion air to the mixing box.

11. A particulate deflagration combustion engine according to claim 10 further comprising:
    said control panel attached to said fuel and air mixture delivery system and controlling the delivery of fuel and air mixture to the combustion chamber.

12. A method for operating a particulate deflagration combustion engine comprising:
    mixing particulate fuel with dried and compressed combustion air to form a fuel and air mixture,
    feeding the fuel and air mixture into a combustion chamber of a cylinder of a particle deflagration combustion engine,
    firing dual ignition source located within the walls of the combustion chamber to ignite the fuel and air mixture,
    removing hot combustion gases from the combustion chamber after ignition of the fuel and air mixture, and
    using the hot combustion gases to remove moisture from an air dryer that provides dry combustion air for the engine by creating a venturi that pulls a vacuum on the air dryer as the hot combustion gases vent to atmosphere.

13. A method for operating a particulate deflagration combustion engine comprising:
    mixing particulate fuel with dried and compressed combustion air to form a fuel and air mixture,
    feeding the fuel and air mixture into a combustion chamber of a cylinder of a particle deflagration combustion engine,
    firing dual ignition source located within the walls of the combustion chamber to ignite the fuel and air mixture,
    monitoring the parameters of burn characteristics of the ignition occurring in the combustion chamber, moisture content of the dried combustion air, and oxygen content of the fuel and air mixture, and
    controlling the operation of the particulate deflagration combustion engine based on the monitored parameters.

* * * * *